United States Patent
Hughes

(10) Patent No.: US 8,155,939 B2
(45) Date of Patent: Apr. 10, 2012

(54) PARTICLE-SURFACE INTERACTION MODEL AND METHOD OF DETERMINING PARTICLE-SURFACE INTERACTIONS

(75) Inventor: David W. Hughes, Columbia, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 811 days.

(21) Appl. No.: 12/170,683

(22) Filed: Jul. 10, 2008

(65) Prior Publication Data

US 2009/0312994 A1 Dec. 17, 2009

Related U.S. Application Data

(60) Provisional application No. 61/061,033, filed on Jun. 12, 2008.

(51) Int. Cl.
*G06F 17/10* (2006.01)
*G06G 7/48* (2006.01)
*G06G 7/70* (2006.01)

(52) U.S. Cl. ..................... 703/6; 703/2; 703/5
(58) Field of Classification Search ............ 703/12, 703/2, 5–6

See application file for complete search history.

(56) References Cited

OTHER PUBLICATIONS

Neumann, E. "MyPhysicsLab—Rigid Body Collisions", 2004, 11 pages, accessible at http://www.myphysicslab.com/collision.html.*
Witkin, A. "Physically Based Modelling: Principles and Practice Particle System Dynamics", SIGGRAPH '97 Course Notes, 1997, 13 pages.*
Deverich, I.V. "Probabilistic Model of a Particle-Rough Wall Collision", Journal of Applied Mechanics and Technical Physics, vol. 40, No. 5, 1999, pp. 989-994.*
Cross, R. "Measurements of the horizontal coefficient of restitution for a superball and a tennis ball", Am. J. Phys. vol. 70 No. 5, May 2002, pp. 482-489.*
Lee, A.L. "Particle Dispersion Around a Spacecraft", AIAA '83, Jan. 10-13, 1983, 8 pages.*
Baraff, D. "An Introduction to Physically Based Modelling: Reigid Body Simulation I—Unconstrained Rigid Body Dynamics", SIGGRAPH '97 Course Notes, 1997, 32 pages.*
Farkas et al. "Measurement of coefficient of restitution made easy", Physics Education vol. 40, No. 1, Jan. 2006, 4 pages.*
Thornton et al. "A theoretical model for the stick/bound behavior of adhesive, elastic-plastic spheres", Powder Technology vol. 99, 1998, pp. 154-162.*
Stokes, S. "Collision detection in the simulation of rigid body motion", Sep. 29, 2005, 60 pages.*
Robinson, S. "The Visualisation of Forces in Dynamic Simulations", May 2002, 67 pages.*
"Contamination Control Plan for Midshipman Space Technology Applications Research (MidSTAR)-1 Spacecraft", 2004, 11 pages, accessed at http://www.usna.edu/Satellite/midstar/.../Contamination%20Control%20Plan.doc.*
Eugene N. Borson, "A model for particle redistribution during spacecraft launch", Proceedings of SPIE, vol. 4774, (2002), pp. 67-78.
A. Busnaina et al., "Submicron Particle Motion and Deposition in a CVD Chamber", Institute of Environmental Sciences Proceedings vol. 2 (1992), pp. 1-9.

(Continued)

*Primary Examiner* — Kamini S Shah
*Assistant Examiner* — Suzanne Lo

(57) ABSTRACT

A method and model of predicting particle-surface interactions with a surface, such as the surface of a spacecraft. The method includes the steps of: determining a trajectory path of a plurality of moving particles; predicting whether any of the moving particles will intersect a surface; predicting whether any of the particles will be captured by the surface and/or; predicting a reflected trajectory and velocity of particles reflected from the surface.

1 Claim, 5 Drawing Sheets

OTHER PUBLICATIONS

A.L.Lee, "Particle Dispersion Around a Spacecraft", American Institute of Aeronautics and Astronautics, Aerospace Science Meeting, 21st, Reno, NV (1983), 8 pages.

C. Thornton et al., "A theoretical model for the stick/bounce behavior of adhesive, elastic-plastic spheres", Powder Technology 99 (1998), pp. 154-162.

* cited by examiner

PARTICLE-SURFACE INTERACTION MODEL AND METHOD OF DETERMINING PARTICLE-SURFACE INTERACTIONS

ORIGIN OF INVENTION

The invention described herein was made by an employee of the United States Government, and may be manufactured and used by or for the Government for governmental purposes without the payment of any royalties thereon or therefor.

RELATED APPLICATION

This application is based upon prior filed provisional patent application Ser. No. 61/061,033 filed Jun. 12, 2008, the entire subject matter of which are incorporated by reference herein.

BACKGROUND OF THE INVENTION

The present invention is related to the modeling of the interactions between particles and surfaces.

Modeling of the transport of particles around spacecraft in orbit is a poorly developed science. No current models account for the way in which real particles bounce off of surfaces when they impact.

The process by which particle contamination moves throughout a system may be divided into three phases. The first phase is generation and release from a surface, the second phase is transport through air or vacuum, and the third phase is reflection or deposition on a surface. The first two phases have been the focus of prior art, such as the studies referenced in E. N. Borson, "A model for particle redistribution during spacecraft launch," Proceedings of SPIE Vol. 4774, (2002), pp 67-78, the entire disclosure of which is incorporated by reference herein.

With respect to the generation and release of particles from a surface, many particles are generated by wear between moving surfaces while other particles are "pre-existing" on a surface due to contamination built up over the life of the surface.

Most particle generation on spacecraft occurs during ground processing. Particles shed from personnel, such as garment fibers and skin cells, have a low mass to drag ratio and are transported throughout the clean room by air flow. Abrasion of materials, such as drilling, grinding, and cutting, produces particles with a high mass to drag ratio, and these particles settle close to the point of generation.

Deployable systems such as antenna booms, solar arrays, and covers create materials after spacecraft are in orbit. Actuators create particles at various velocities: pyrotechnical devices release high speed particles, spring cutters release medium speed particles, and sealed wax actuators release slow particles.

Particles may be released from surfaces by vibration or other external forces.

With respect to the transport of particles, drag is the viscous friction effect exerted on a moving particle by the medium it is in. The result is that large particles tend to stray from the flow direction because of momentum but small particles follow the flow direction and are less likely to impact surfaces. The equations of motion of particles suspended in air may be found in A. Busnaina and X. Zhu, "Submicron Particle Motion and Deposition in a CVD Chamber," Institute of Environmental Sciences Proceedings Volume 2 (1992), pp 1-9, the entire disclosure of which is incorporated by reference herein. As air density drops, the drag also drops, until in vacuum the particles are affected only by gravity. More information regarding particle motion in a vacuum can be found in A. L. Lee, "Particle Dispersion Around a Spacecraft", American Institute of Aeronautics and Astronautics, Aerospace Science Meeting, $21^{st}$, Reno, Nev., Jan. 10-13, 1983, the entire disclosure of which is incorporated by reference herein.

Regarding the reflection or deposition on a surface, when a moving particle impacts a surface, energy is lost through the compression of the particle and the surface. Some theoretical treatment of this phenomenon exists in the literature such as C. Thornton et al., "A theoretical model for the stick/bounce behavior of adhesive, elastic-plastic spheres", Powder Technology 99 (1998), pp 154-162 the entire disclosure of which is incorporated herein by reference. Kinetic energy is also converted between translational and rotational modes as the particle tumbles. The tendency to tumble is a function of surface roughness, particle shape, and impact angle.

Whether a particle impacting a surface will stick is determined by whether the potential energy stored in compression is great enough to overcome the forces holding the particle to the surface. Particles on a surface are held to the surface by several forces, but the large forces are electrostatic attraction, surface energy, and surface tension.

If the particle bounces, the direction of the bounce may be affected by rotational momentum, surface roughness, and particle shape.

The prior art is lacking in a model for this last phase of particle transport. The present invention provides a comprehensive approach for describing and modeling the interactions between a particle and a surface.

SUMMARY OF THE INVENTION

The present invention is directed to a method of predicting particle-surface interactions with a surface such as a spacecraft. The method includes the steps of: determining a trajectory path of a plurality of moving particles; predicting whether any of the moving particles will intersect a surface; predicting whether any of the particles will be captured by the surface and/or; predicting a reflected trajectory and velocity of particles reflected from the surface.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

DETAILED DESCRIPTION OF THE INVENTION

Figure 1:
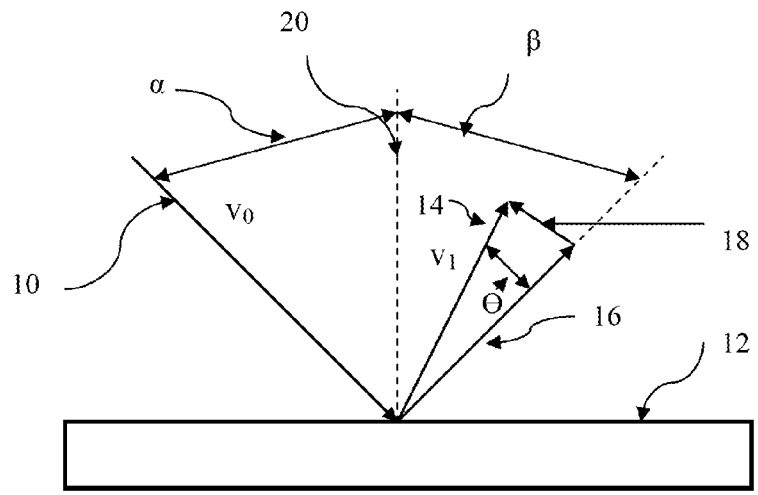
FIG. 1 is a diagram of a particle—surface interaction.

Referring to the Figures in more detail and particularly referring to FIG. 1, there is shown a diagram of a particle surface interaction. Arrow 10 denotes a vector of an incoming particle having incoming velocity $v_0$. Vector 10 strikes surface 12 and is reflected from the surface as shown by arrow 14 which denotes a vector of the reflected particle having reflected or outgoing velocity $v_1$. Arrow 16 denotes a vector of the specular reflection of the particle. The specular reflection means that the angle of reflection of the reflected particle (as measured between the surface normal 20 and the reflected vector) β equals the angle of incidence (as measured between the surface normal 20 and the incoming vector) α. The difference between the actual reflected vector 14 and the specular reflection vector 16 is a diffuseness vector 18. The angle between the actual reflected vector 14 and the specular vector is ϴ.

According to one preferred embodiment of the invention, there is a model for particle-surface interactions which includes a coefficient of restitution parameter, a diffuseness parameter, a coefficient of momentum transfer parameter, and a sticking velocity parameter.

The coefficient of restitution (COR) is the fraction of translational momentum retained by the particle after interacting with the surface. In a perfectly inelastic collision, all of the energy is retained by the particle and the COR is 1. The highest measured COR for materials is around 0.9 for glass beads on a glass plate. COR is a material property and applies to both the particle and the surface; the effective COR is the product of the individual particle and surface COR values.

The coefficient of momentum transfer (COM) is a measure of the conversion between rotational and translational modes during a particle-surface interaction. COM is primarily a function of the particle moments of inertia. The fraction of energy converted on any given bounce is a random number with a Gaussian distribution about 0 (negative being taken as conversion to translational momentum, positive as conversion to rotational momentum). The COM is the standard deviation of the aforementioned Gaussian distribution. Neither momentum is allowed to become negative. The conversion is applied after the energy reduction due to the COR.

The diffuseness parameter, also known as diffusivity, is a measure of the randomness of the bounce direction. Alternately, the complement (1-diffusivity) is the specularity of the bounce. For a perfectly specular bounce such that diffusivity=0, the angle between the incoming direction and surface normal equals the angle between the reflecting direction and surface normal, and the reflecting vector is in the plane of the incoming vector and surface normal. A perfectly diffuse bounce has the reflecting vector distributed in a Lambertian fashion, with the probability of any direction being proportional to the cosine of the angle between the surface normal and that direction. The model of the present invention uses the diffusivity as an interpolation fraction between the specular direction and a random, Lambertian direction. Other distributions besides Lambertian may be used to model surfaces with anisotropic diffuseness. Diffusivity is a function of the particle shape and surface irregularities. The two diffusivities must be combined in a manner that meets certain criteria: when one value is 0 (perfectly specular), the result should equal the other value of diffusivity; the maximum value should be 1; and when both values are intermediate, the result should be larger than the higher of the values, because the higher of the values would be used if the smaller were zero. The method of combination that meets these criteria is to use the complement of the combined specularity, where the combined specularity is the product of the particle and surface specularities.

An additional feature of the model is the assumption that conversion between rotational and translational modes affects the direction of travel. This is implemented by using the ratio of the converted momentum to the total momentum as an additional diffuseness term that is combined according to the multiplication of specularities. The result is that no change in diffuseness occurs when the momentum conversion is zero, but transformation of all of the momentum would result in total randomization of the direction.

The sticking velocity is the velocity below which the particle does not possess enough kinetic energy to escape from the forces holding it to the surface. Both the particle and the surface contribute to the binding energy. Because kinetic energy is proportional to velocity squared, the effective sticking velocity is given by the square root of the sum of the squared velocities. The algorithm applies this test after energy is converted between translational and rotational modes. If the particle does not possess the velocity required to escape, but does possess rotational velocity, the condition may be interpreted as rolling on the surface.

In operation of the particle—surface interaction model, the sticking velocity parameter is determined to see if the particle sticks to the surface. If the particle does not stick to the surface then the coefficient of restitution parameter, diffuseness parameter and coefficient of momentum transfer parameter are determined to result in the direction that the particle bounces from the surface.

As will be apparent to those skilled in the art of numerical simulation, the surface interaction model may be easily added to any particle transport simulation wherein the influence of surface bounces on the particle motion is non-negligible.

According to one preferred embodiment of the invention, there is a method for determining particle—surface interactions. The algorithm here gives the example for motion of particles in a vacuum that are sufficiently separated that particle-particle collisions are negligible.

Figure 2:
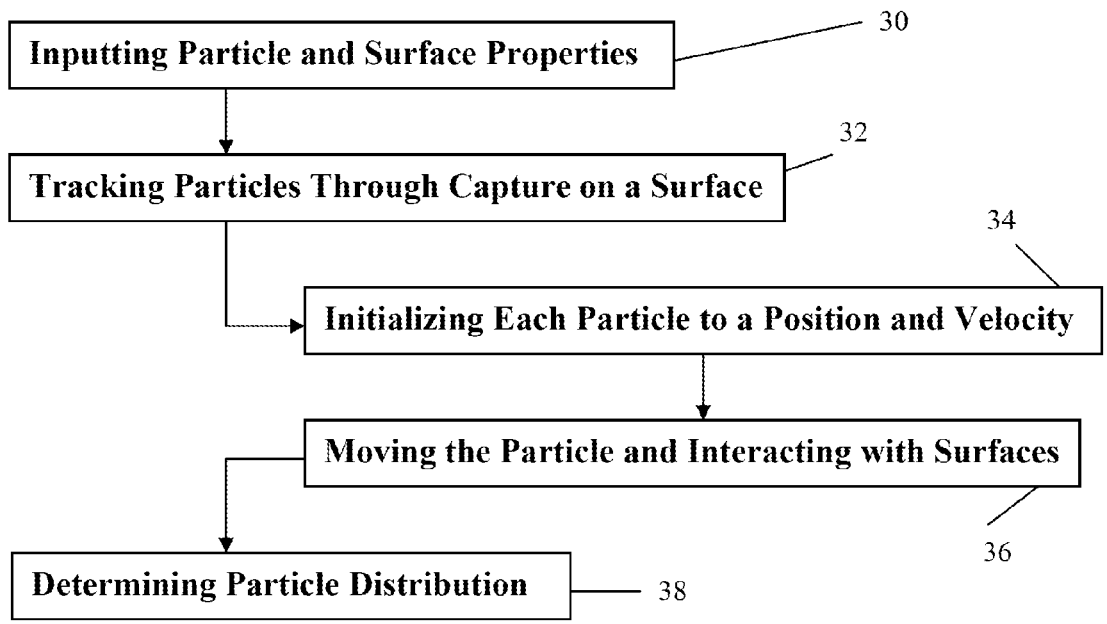
FIGS. 2 through 7 are flow charts illustrating the method according to the present invention.
Figure 3:
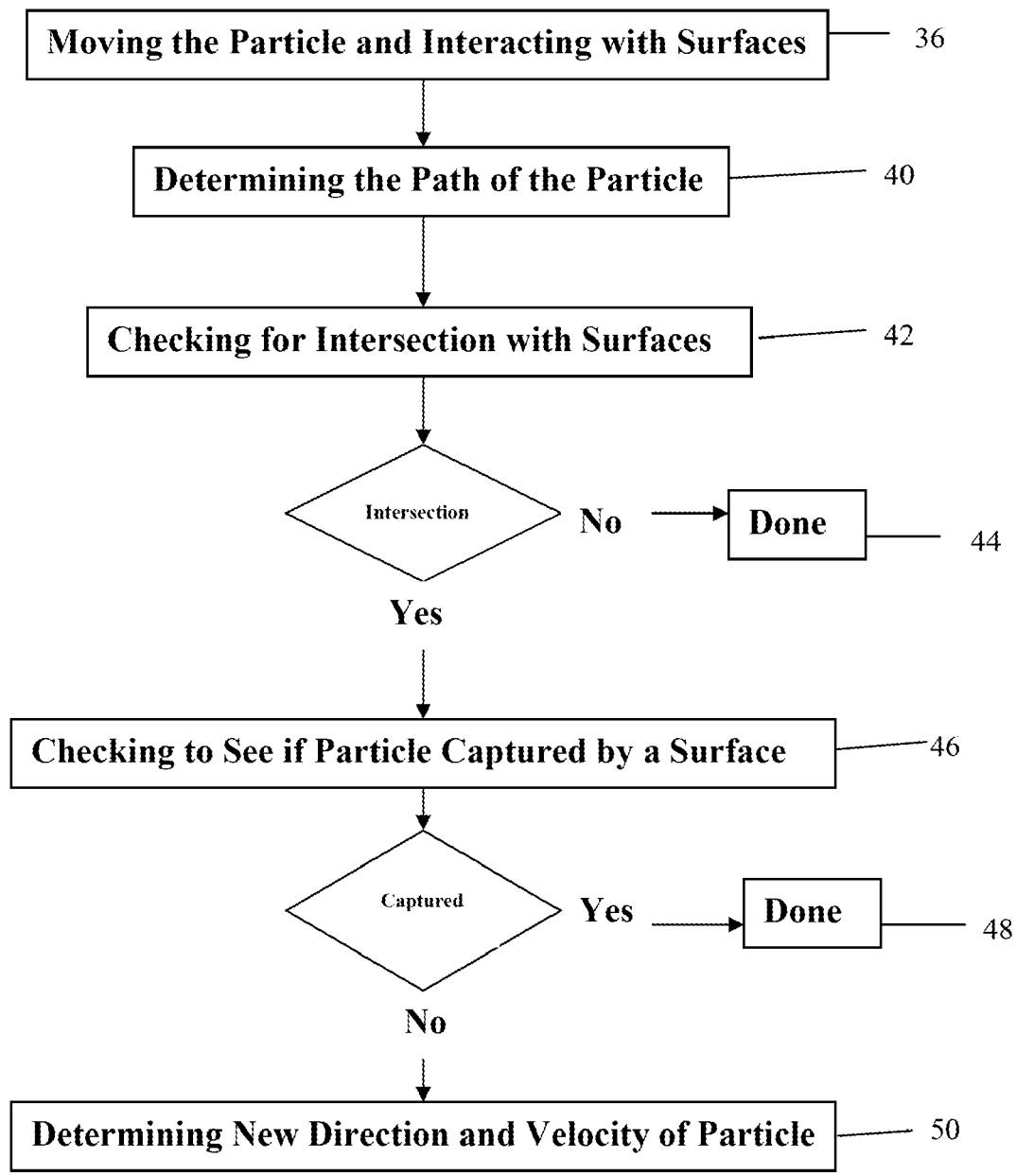
Figure 4:
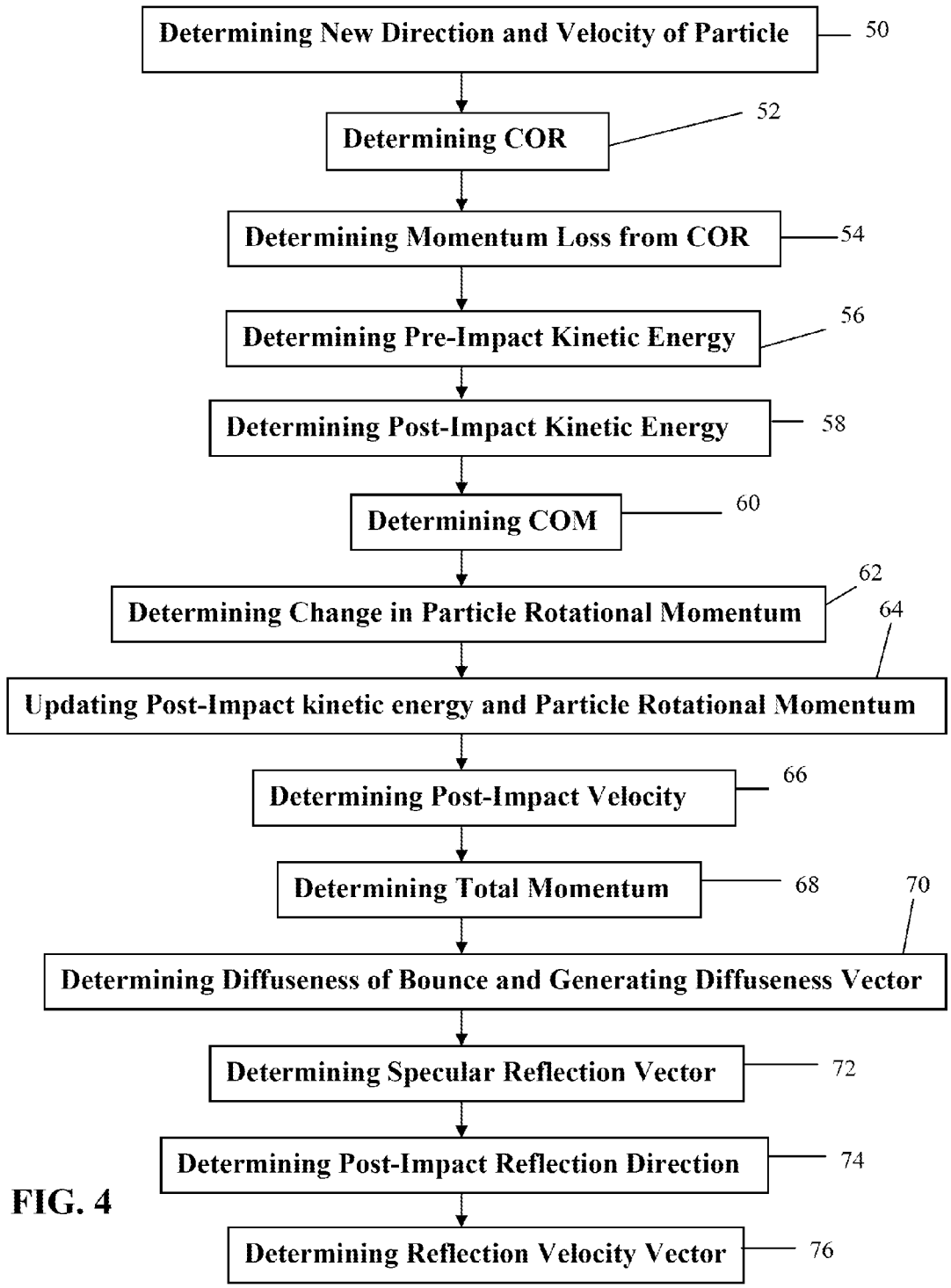

Referring to FIGS. 2 to 4, and particularly FIG. 2, the method according to the present invention is illustrated. The method includes first in step 30 inputting properties for the particles and surface followed by a loop in which a specified number of particles are tracked from generation through capture on a surface in step 32, and then determining particle distribution statistics from the results of the tracked particles in step 38.

The tracking loop of tracking particles through capture on a surface in step 32 includes initializing each particle to a position and velocity in step 34, using rules specified by the user, and then moving the particle and interacting with surfaces until the particle velocity is set to zero in step 36 or the particle exits the simulation domain (spatial or temporal extent).

Referring now to FIG. 3, moving the particle (step 36 from FIG. 2) includes calculating the path of the particle through space in step 40, checking for intersection of the particle path with surfaces in step 42, and if an intersection occurs with a surface. If there is no intersection with a surface, the calculation is done as indicated in step 44 because there will be no particle—surface intersection. If there is an intersection of the particle with a surface, then the method continues. After it is determined that there is a particle—surface intersection in step 42, the next step 46 is checking to see if the particle is captured by the surface. If the particle is captured by the surface, the modeling is done as indicated by step 48 because there will be no further particle or surface activity. If the particle is not captured by the surface, then the next step 50 in the method is determining the new direction and velocity of the particle after the surface intersection.

Referring now to FIG. 4, further steps are described with respect to calculating the new direction and velocity of the particle (step 50 in FIG. 3). Initially, the coefficient of restitution is determined in step 52 or may occur prior to step 30 and be provided to step 52 as a constant value. More details will be provided hereafter on the method for determining the COR.

Then, the momentum loss is determined from the COR in step 54. Surface COR is combined with particle COR by taking the product of the two. The particle COR may be fixed, or may be calculated from material properties and the velocity at impact.

In the following equations, "y" is understood to be in the vertical direction and "x" is understood to be in the horizontal direction.

In the following equations 1 through 17, the following symbols have the noted meanings:

$v_{y1}$, $v_{x1}$=reflected velocity in the y and x directions, respectively $v_{y0}$, $v_{x0}$=incoming velocity in the y and x directions, respectively a=acceleration
t=time
$y_1$=reflected height of particle
$y_0$=initial height of particle
$x_1$=reflected distance in x direction
$x_0$=initial distance in x direction
$v_{x0}$=the initial velocity in the x direction
v=total velocity
$\vec{u}$=unit vector
$v_x$=velocity in x direction
$v_y$=velocity in y direction
K=translational kinetic energy
U=rotational kinetic energy
m=mass of particle
I=moment of inertia
$\omega_1$=rotational velocity after reflection
$\omega_0$=rotational velocity before reflection
COR=coefficient of restitution
COM=coefficient of momentum transfer
$\vec{v}$=vector representing reflected particle
$\vec{v}_{specular}$=vector representing reflected particle in specular direction
$\vec{v}_{lambertian}$=vector representing reflected particle in a random direction
$\ominus$=angle between reflected particle vector and specular vector
d=diffuseness The pre-impact kinetic energy is determined in step 56 as one half particle mass multiplied by the particle velocity (relative to the surface) squared:

$$K_0 = \frac{1}{2}mv_0^2 \qquad \text{Equation (1)}$$

This is multiplied by the square of the effective COR to determine the post impact kinetic energy in step 58:

$$K_1 = \frac{1}{2}m(COR^2)v_0^2. \qquad \text{Equation (2)}$$

The coefficient of momentum transfer (COM) is determined in step 60, or may occur prior to step 30 and be provided to step 60 as a constant value. More details will be provided hereafter on the methodology for determining COM.

If the particle has a COM, the change in rotational energy is determined in step 62 as the product of the post impact kinetic energy and a random variable with a Gaussian distribution centered at zero with a standard deviation equal to the COM:

$$\Delta I\omega^2 = [\text{Gaussian}(0, COM)][K_1] \qquad \text{Equation (3)}$$

If the change in momentum would decrease the particle rotational momentum below zero, the change in momentum is set equal to the particle rotational momentum, indicating that no rotation will be present after the bounce. If the change in momentum would reduce the kinetic energy below a fixed percentage of the post impact value, the change is reduced to ensure that some translational energy remains; if not, the particle could spin in place, a non-physical result.

The post impact kinetic energy and the particle rotational momentum are updated in step 64 with the change in momentum:

$$K_2 = K_1 - \Delta I\omega^2 \qquad \text{Equation (4)}$$

The post impact velocity is determined in step 66 from the square root of two divided by particle mass multiplied by the kinetic energy:

$$v_1 = \sqrt{\frac{2K_2}{m}} \qquad \text{Equation (5)}$$

The total energy is determined in step 68 as the sum of the particle rotational and translational energy. If this value is greater than zero, the diffuseness of the bounce is determined as the complement of one minus the fraction change in momentum divided by total momentum, multiplied by one minus particle diffuseness, multiplied by one minus the surface diffuseness:

$$1 - d_{Effective} = [1 - d_{COM}][1 - d_{Particle}][1 - d_{Surface}] \qquad \text{Equation (6)}$$

The determination of the diffuseness is discussed in more detail hereafter.

If the diffuseness is greater than zero, a random unit length direction vector is generated in step 70. The length of this vector is multiplied by the diffuseness. The specular reflection direction in step 72, which was determined during the step of checking for intersection with surfaces in step 42 in FIG. 3, is multiplied by one minus the diffuseness. These two vectors are added together to get the post impact reflection direction in step 74 which is multiplied by the post impact velocity scalar to get the reflection velocity vector in step 76:

$$\vec{v}_1 = \vec{v}([1-d]\vec{u}_{Specular} + [d]\vec{u}_{Random}) \qquad \text{Equation (7)}$$

If the surface is moving, the reflection velocity vector is decomposed into a component normal to the surface and a component in the plane of the surface. The surface friction is used to update the in-plane component by adding the element in-plane motion multiplied by friction to the reflection in-plane component multiplied by one minus the friction. The surface normal component of motion is added to the reflection normal component. The velocity vector is re-composed by adding these two resultant vectors.

A special condition exists when the surface motion is away from the particle; the reflection velocity may be towards the surface rather than away. This is interpreted as a soft landing, and the post impact velocity is set to zero.

At this point, the model is complete in that the direction and velocity of the reflected particle has been determined after the particle—surface interaction.

Figure 5:
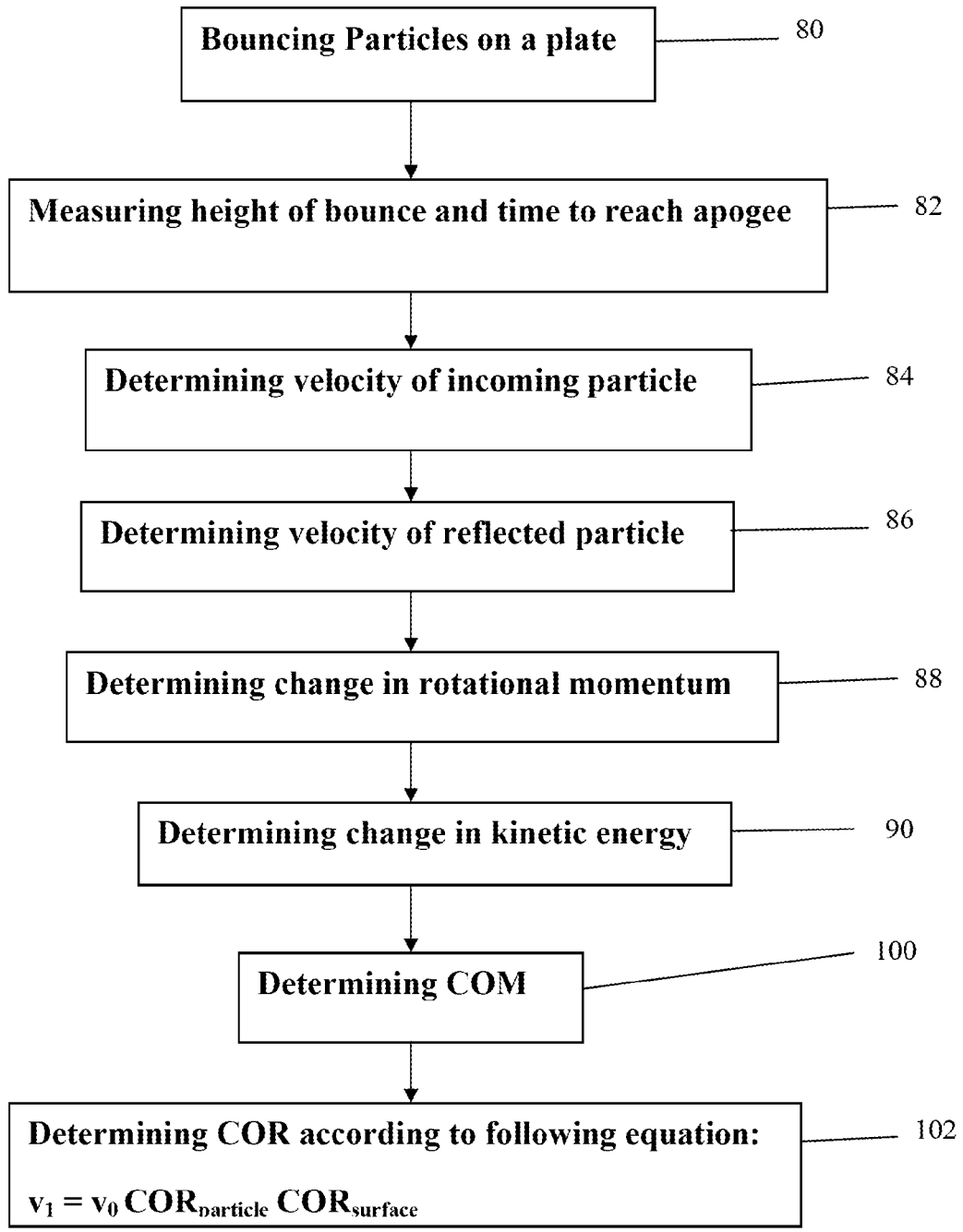

Referring now to FIG. 5, the methodology for obtaining the COR will be described. The methodology begins in step 80 with bouncing a plurality of particles on a plate (one at a time) under the influence of gravity and the location and times of impact are observed, for example with a pair or high speed cameras.

From Newton's laws of motion, assuming no air drag (performing the test in a vacuum chamber), there is a ballistic trajectory:

$$v_{Y1} = v_{Y0} + at \quad \text{Equation (8)}$$
$$y_1 = y_0 + v_{Y0}t + \frac{1}{2}at^2$$
$$x_1 = x_0 + v_{X0}t$$

In the next step 82, the height of the bounce of each particle is measured and the time to reach apogee is determined. The maximum height of a bounce is achieved when vertical velocity is reduced to zero, which can be solved for the time to reach apogee. The total time of flight is twice that time, yielding the following solution for the initial velocity components in step 84 as a function of distance traveled and time of flight:

$$v_{Y0} = -a\frac{t}{2} \quad \text{Equation (9)}$$
$$v_{X0} = \frac{\Delta x}{t}$$

Total velocity may be found by combining the vector components:

$$v = \sqrt{v_X^2 + v_Y^2} \quad \text{Equation (10)}$$

Ideally, the velocity decreases after each bounce by the COR of the particle and surface so that the reflected velocity in step 86 is:

$$v_1 = v_0 COR_{particle} COR_{surface} \quad \text{Equation (11)}$$

Real particles, however, have angular momentum; energy transferred between translational and angular momentum will cause a reduction or increase in the velocity. Assuming the particle and surface COR are fixed properties, the ratio of velocities at each bounce ($v_1/v_0$, $v_2/v_1$, etc) will be a constant plus or minus the fraction of energy participating in the translational—angular momentum conversion in step 90. The energy balance is therefore:

$$K + U = \frac{1}{2}mv^2 + I\omega \quad \text{Equation (12)}$$
$$\frac{1}{2}mv_1^2 + I\omega_1^2 = \frac{1}{2}mv_0^2 + I\omega_0^2 - \frac{1}{2}m[(COR)v_0]^2$$

From which we can get the predicted velocity $v_1$ or measured change in rotational energy:

$$v_1 = \sqrt{\frac{2}{m}\left[\frac{1}{2}m[1-(COR)^2]v_0^2 + I(\omega_0^2 - \omega_1^2)\right]} \quad \text{Equation (13)}$$
$$\Delta I\omega^2 = \frac{1}{2}m([1-(COR)^2]v_0^2 - v_1^2)$$

If the changes in rotational energy are distributed normally, the Coefficient of Momentum transfers (step 100) may be considered the standard deviation of the energy change normalized by kinetic energy:

$$COM = stdev\left(\frac{\Delta I\omega^2}{\frac{1}{2}mv_0^2}\right) \quad \text{Equation (14)}$$

Furthermore, assuming the changes in angular velocity are distributed normally, the particle COR may be found by using equation (4) as the average of many measurements. The individual COR values calculated this way will be normally distributed around the particle COR due to the effect of the momentum transfer. Then, using a surface for which $COR_{surface}$ is known (such as 0.9 for a glass plate), equation 4 may be easily solved to determined $COR_{particle}$ as shown in step 102.

Figure 6:
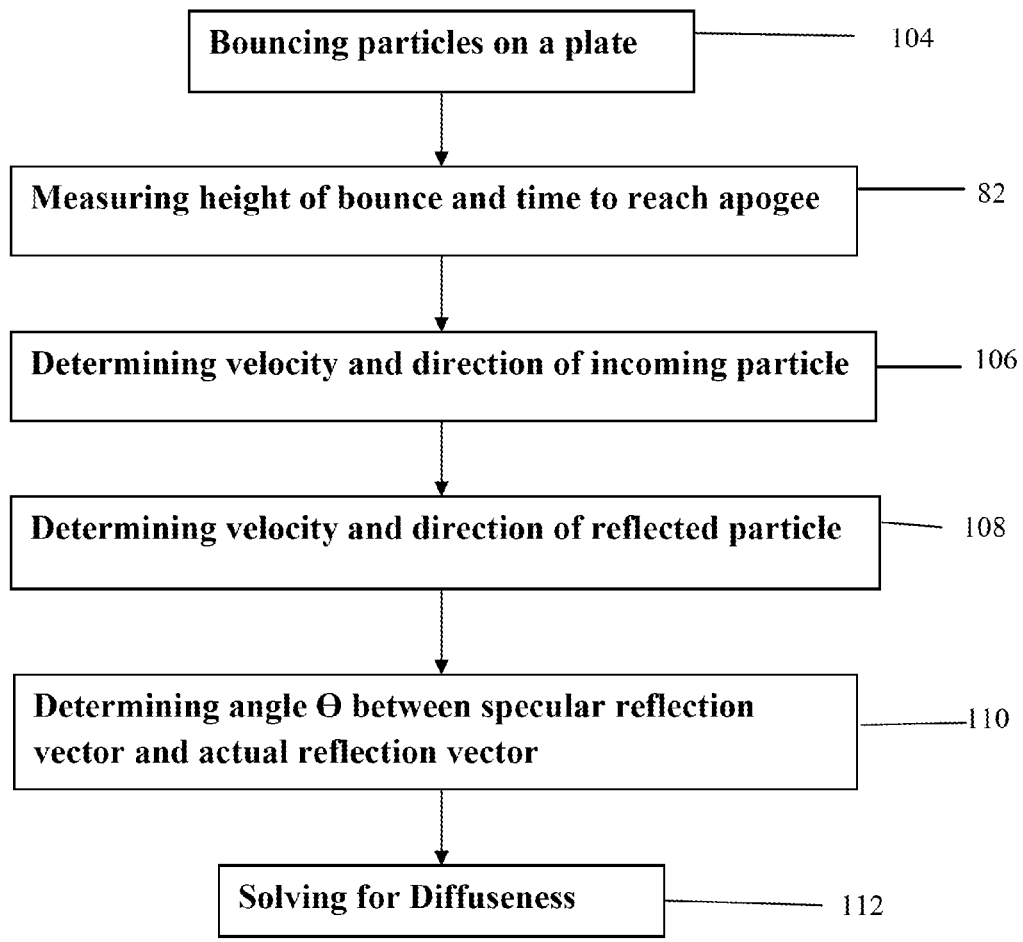

Referring now to FIG. 6, the methodology for obtaining the diffuseness parameter will be described. The methodology begins in step 104 by bouncing a plurality of particles (one at a time) on a plate under the influence of gravity and the location and times of impact are observed, for example with a pair or high speed cameras.

The angle of incidence when impacting after the ballistic trajectory it followed equals the launch angle. The variation in the launch angle after impact is modeled according to the following relationship using diffuseness to interpolate between the specular direction and a random lambertian vector:

$$\vec{v}_1 = \vec{v}_{specular}(1-\text{diffuseness}) + \vec{v}_{lambertian}(\text{diffuseness})$$

$$\theta = \arccos(\vec{v}_1 \cdot \vec{v}) \quad \text{Equation (15)}$$

The velocity and direction of the incoming particle is determined (step 106) from the measured data and then the velocity and direction of the reflected particle is determined (step 108) from the measured data. Next, in step 110, the angle variation may be found from the measured data using:

$$\theta = \arccos\left(\frac{v_{X1}v_{X0} + v_{Y1}v_{Y0}}{\sqrt{v_{X1}^2 + v_{Y1}^2}\sqrt{v_{X0}^2 + v_{Y0}^2}}\right) \quad \text{Equation (16)}$$

Since the maximum deviation would occur when the lambertian vector is parallel but opposite the X velocity component, and the specular direction has the initial velocity components, $$\vec{v}_{specular} = \langle v_{X0}, v_{Y0}\rangle \quad \text{Equation (17)}$$

$$\vec{v}_1 = \langle v_{X0}, v_{Y0}\rangle(1-d) + \langle -v_{X0}, 0\rangle(d)$$
$$= \langle(1-2d)v_{X0}, (1-d)v_{Y0}\rangle$$
$$= \langle v_{X1}, v_{Y1}\rangle$$

$$d = \frac{1}{2}\left(1 - \frac{v_{X1}}{v_{X0}}\right) = \left(1 - \frac{v_{Y1}}{v_{Y0}}\right)$$

Diffuseness can then be solved for using either horizontal or vertical velocity change, assuming enough trials have been run so that the worst case deviation from specular has been measured.

Alternatively, diffuseness can be solved for by geometric reasoning.

For small particles, it is possible to find sticking velocity by reducing the drop distance until no bounces occur and calculating the velocity from the drop distance. Alternatively, the model may implement a velocity dependent sticking velocity as proposed in the Thornton et al. paper discussed above.

One application of the present invention is spacecraft contamination control. Particle contamination can cause failure of spacecraft mechanisms and degradation of optical imaging capability, and can interfere with guidance and navigation sensors. By implementing the particle surface interaction model of the present invention, one can predict contamination transport, or where particle contamination will likely develop. By knowing the relative movement of the spacecraft, rotational and translation movement in orbit, the likely sources of particle contamination, the interaction model can be integrated into an algorithm to map particle contamination on the surfaces of the spacecraft. Knowledge of likely contaminated surfaces is useful during the design and control of spacecraft. By continuing to apply the interaction model, the design can be altered and evolve to curb or isolate contamination on certain surfaces of the spacecraft. Particle surface contamination can also be a factor to control flight dynamics of an orbiting space, again curbing or isolating particle contamination on more sensitive portions of the spacecraft.

It should be understood that while the bulk of the foregoing discussion has focused on particulate contamination on spacecraft, the present invention is not limited to such applications and is applicable to other particle sources and environments.

Figure 7:
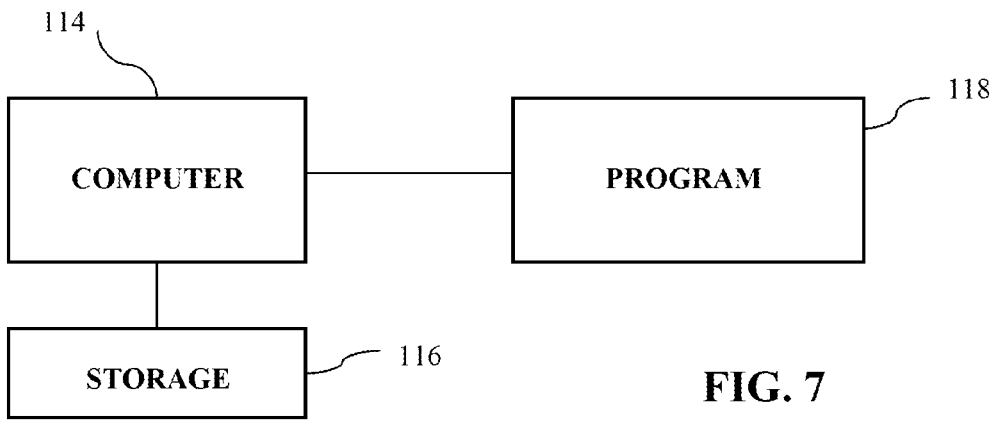

FIG. 7 is a block diagram that illustrates an exemplary hardware environment of the present invention. The present invention is typically implemented using a computer 114 comprised of microprocessor means, random access memory (RAM), read-only memory (ROM) and other components. The computer may be a personal computer, mainframe computer or other computing device. Resident in the computer 114, or peripheral to it, will be a storage device 116 of some type such as a hard disk drive, floppy disk drive, CD-ROM drive, tape drive or other storage device.

Generally speaking, the software implementation of the present invention, program 118 in FIG. 7, is tangibly embodied in a computer-readable medium such as one of the storage devices 116 mentioned above. The program 118 comprises instructions which, when read and executed by the microprocessor of the computer 114 causes the computer 114 to perform the steps necessary to execute the steps or elements of the present invention.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

The invention claimed is:

1. A program storage device readable by a machine, tangibly embodying a program of instructions executable by the machine to perform method steps for determining particle—surface interactions, the method steps comprising the steps of:

inputting particle and surface properties;

tracking a plurality of particles through capture on a surface; and determining a distribution of particles reflecting from the surface;

wherein the step of tracking a plurality of particles through capture on a surface comprises the step of initializing each particle to a position and velocity and moving the particles and interacting with a surface;

wherein moving the particles and interacting with a surface comprises the steps of determining a path of each of the particles;

checking whether each of the particles intersects with the surface and proceeding to the next step for each particle where there is an intersection;

checking whether each of the particles is captured by the surface and proceeding to the next step for each particle which is not captured by the surface; and determining a new direction and velocity for each particle;

wherein the step of determining a new direction and velocity for each particle comprises the steps of:

determining a coefficient of restitution;

determining a momentum loss from the coefficient of restitution;

determining a pre-impact kinetic energy;

determining a post-impact kinetic energy;

determining a coefficient of momentum transfer;

determining a change in rotational momentum of each particle;

updating the post-impact kinetic energy and rotational momentum of each particle;

determining a post-impact velocity of each particle;

determining a total momentum of each particle;

determining a diffuseness of each particle;

generating a diffuseness vector for each particle;

determining a specular reflection vector;

determining a post-impact reflection direction; and determining a reflection velocity vector wherein the step of determining a diffuseness of each particle comprises the steps of:

inputting measurements of an apogee of each bounce of a plurality of particles bounded on a plate and time to reach the apogee;

determining a velocity and a direction of each incoming particle;

determining a velocity and a direction of each reflected particle;

determining an angle between a specular reflection vector and an actual reflection vector; and determining diffuseness from the angle.

* * * * *